June 27, 1967  D. A. DAVENPORT ETAL  3,328,683
LOW RISE TIME SURGE TESTING APPARATUS
Filed March 1, 1963  2 Sheets-Sheet 1

INVENTORS
ROBERT SCHUBACH &
DONALD A. DAVENPORT
BY
Richard MacCutchen
ATTORNEY

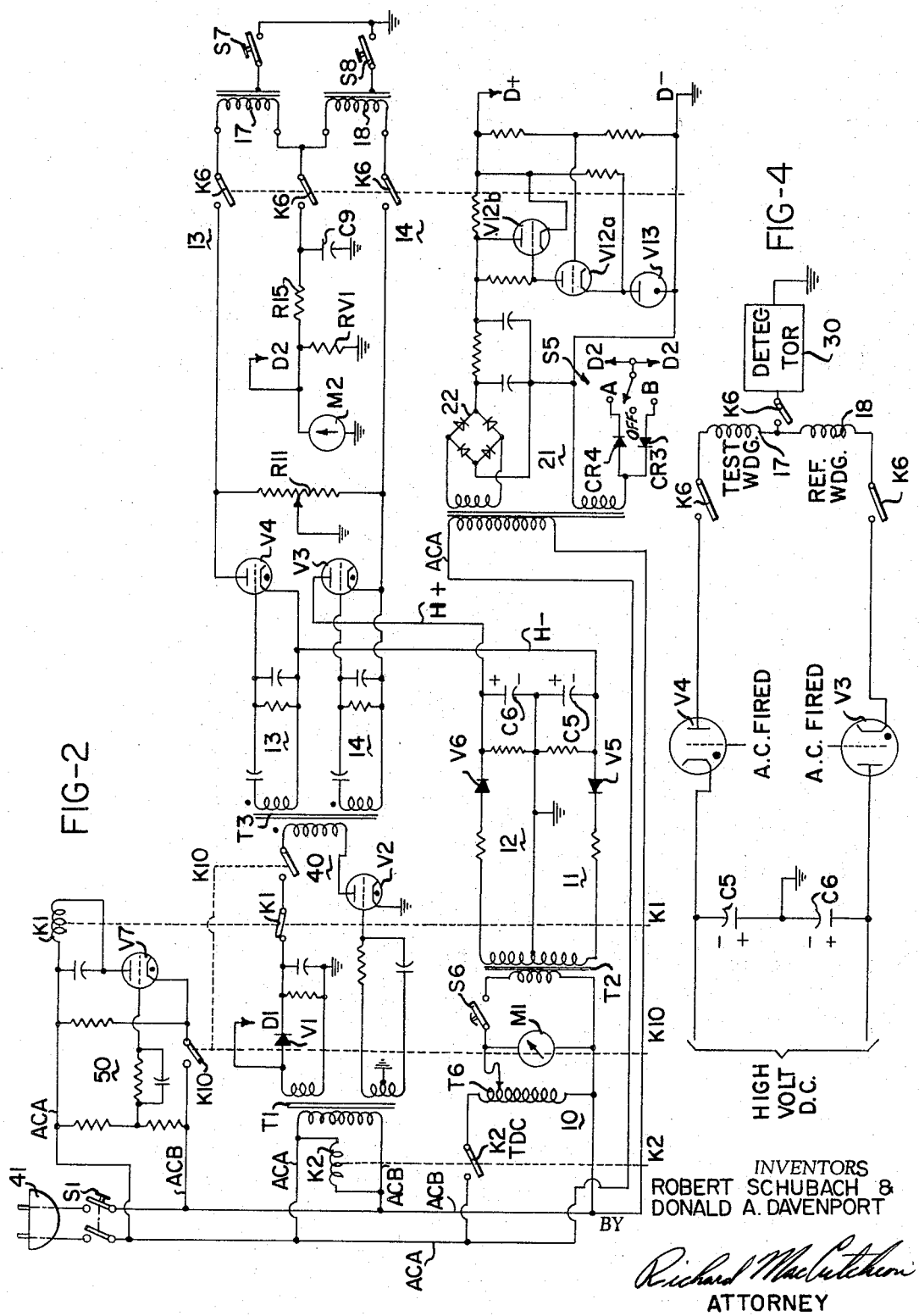

United States Patent Office 3,328,683
Patented June 27, 1967

3,328,683
LOW RISE TIME SURGE TESTING APPARATUS
Donald A. Davenport, Aurora, and Robert Schubach, East Cleveland, Ohio, assignors to Avtron Manufacturing, Inc., Cleveland, Ohio, a corporation of Ohio
Filed Mar. 1, 1963, Ser. No. 262,050
10 Claims. (Cl. 324—51)

The present invention relates to apparatus for testing electrical windings and has significance in connection with the provision of an electronic device for testing the coils of motors, transformers, and the like by applying to any one (or more) of them a surge voltage while at the same time applying an opposite (though otherwise like) surge voltage to another coil (and providing readout indicative of the presence or absence of instantaneous differences of the potentials across the compared windings).

Surge testing consists basically of charging a capacitor to a high potential and then discharging this capacitor into a test winding while (or in some of the prior art, before) the same thing is done into a winding which serves as a standard or reference. When capacitor discharge occurs, a surge of very steep wave front is propagated through the associate windings, its wave shape and decay time being determined by the impedance of the windings but also by the parameters of the circuitry used for making the test. Unlike a tester which utilizes a sustained D.C. or sine wave A.C. voltage, a surge tester induces higher turn-to-turn voltage thus simulating conditions which might be caused by lightning, switching, or other power circuit transients. By the periodic application of high voltage pulses to the coil or coils under test, and appropriate detection methods, surge testing may be used to indicate open circuits, shorted turns, coil to coil faults, coil to ground (e.g., to iron core) faults, wrong number of turns, wrong wire size, or high core loss all in a single test.

While surge testing apparatus has been known in the past, the prior art equipments have been characterized by the necessity of utilizing a synchronized oscilloscope for observing deviation in electrical properties in a coil under test, but the use of such an oscilloscope has greatly added to the complexity and cost of the initial equipment, as well as making proper operation thereof most difficult, thus hampering or preventing the use of unskilled labor for the task of testing windings of varied and large runs of manufactured electrical equipment.

It is an object of the present invention to provide simple means for overcoming the above difficulty and providing relatively simple surge testing appaartus which requires no oscilloscope (although an oscilloscope can be connected thereto if that is desired).

Also in the past, for one reason and another surge testing circuitry has had to have so much series resistance (for example because of trigger trouble with thyratrons) that the individual surge rise time has been as long as ten microseconds. We have. found it desirable to have surges which have much shorter rise time so that, as a consequence, the windings are subjected to relatively great turn-to-turn stress but all the while the test is relatively non-destructive (because the R.M.S. power applied to the windings is very low) and repair, as soon as the fault can be localized is relatively simple, because, in case of fault, small power, heating, charring, melting, etc. are involved.

It is therefore another object of the invention to provide surge testing apparatus which provides shorter rise times than heretofore known, providing, for example, from 0.05 to 0.2 microsecond, thus to provide steeper waves and to stress the windings more while damaging any defective windings less.

Because of the oscillatory decay characteristics of a sharply applied surge, wave shape analysis and detection of any faults therefrom is difficult, and fault detection is more readily accomplished by the comparison methods according to the present invention. Since the oscilloscopes used for surge testing according to the prior art have displayed the entire applied voltage whereas a one or two turn fault is so small as to be practically non-discernible, the prior art methods have required skilled operators and have required them to be furnished with considerable history on the various windings and their characteristics.

By contrast a surge tester according to the present invention uses special circuitry applying a measured rise time of not more than 0.2 microsecond on the leading edge of the applied surge. Any unbalance is fed to a voltage limiting network which retains wave shape, and then to an electronic fault detecting network, and (as shown) also to a zero center output meter. When the fault signal exceeds a preset value, one of two red fault lamps lights (and latches in) indicating whether the fault is in the test or in the reference winding. According to one aspect of the invention test time is preset, for example, at one second, by an electronic timer. If at the end of the one second test interval no fault has occurred, a green "accept" lamp lights and latches in. Sensitivity of the fault detector is individually adjustable for test or reference winding faults; and may be set to reliably detect one turn faults in either the tested or the reference (comparison) winding. Provision is made for self check of the surge tester by means of an internal fault simulator which may be used to produce a fault indication (with no windings connected or being surged by the apparatus). Other objects and advantages will become apparent and the invention may be better understood from consideration of the following description taken in connection with the accompanying drawings in which:

FIG. 2 is a schematic diagram of a power supply arrangement useful for practicing the invention;

Figure 3:
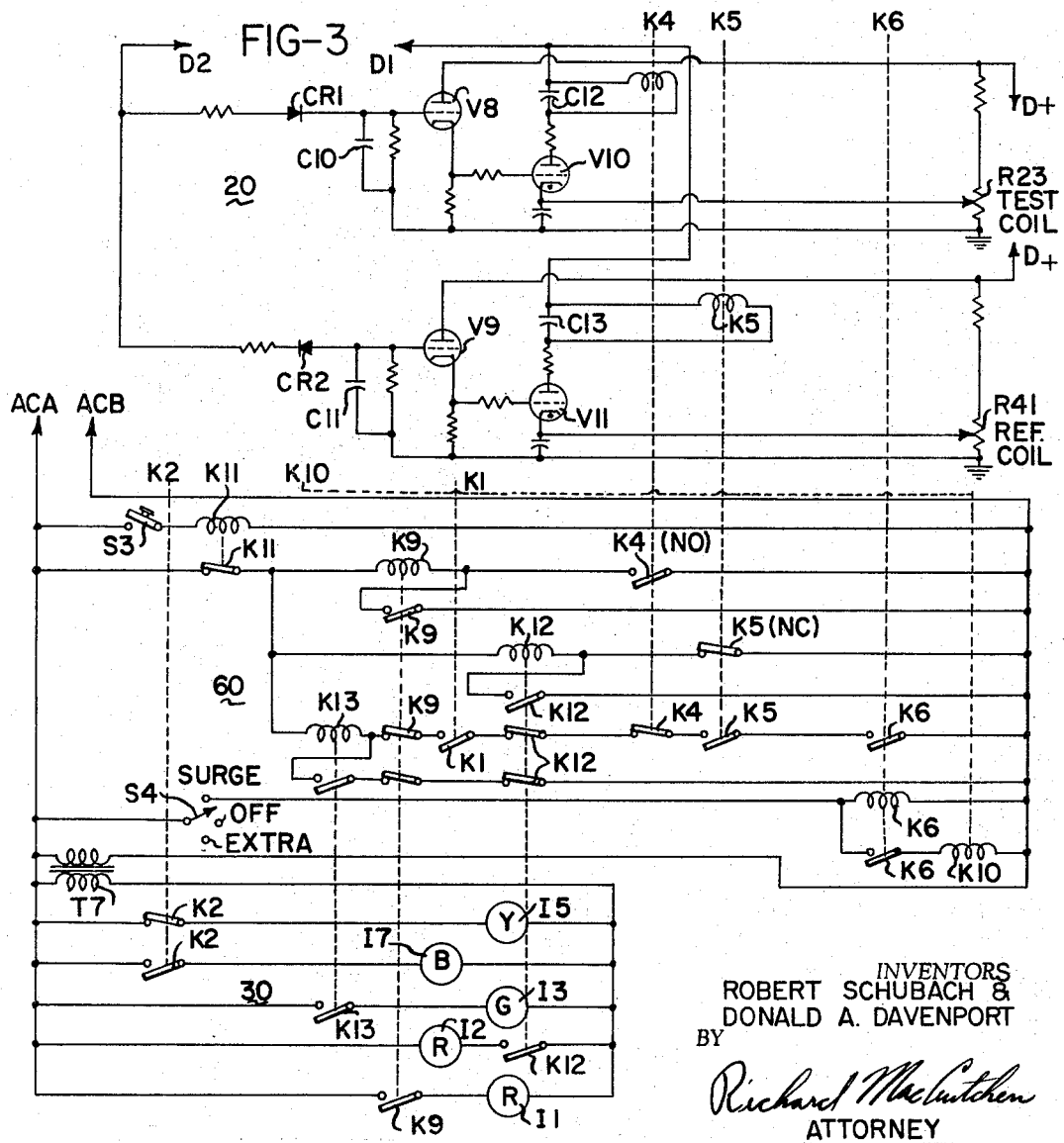

FIG. 3 is a schematic diagram of detector together with logic and readout circuits useful in connection with the apparatus shown in any one of the other figures; and FIG. 4 is a vastly simplified diagram showing a preferred arrangement for surge testing according to the invention and which provides elimination of substantially all resistance in the circuits which provide surge power to tested and reference windings as shown.

Figure 1:
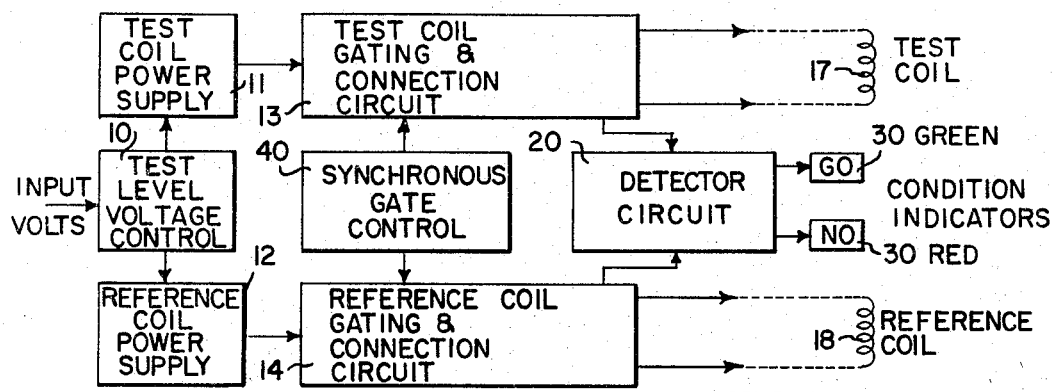
FIG. 1 is a block diagram of apparatus according to the invention.

Referring first to FIG. 1, a test level voltage control 10 (which takes the form of a tapped autotransformer T6 in FIG. 2) affects power supplies 11 and 12 and their respective gating and connection circuits 13 and 14. Through these connection circuits, surge test energization of a test coil 17 is compared with that of a reference coil 18, which might be either a "standard" or another coil of the same production apparatus as contains the so-called test coil. This enables detection of difference (in the case of a fault) through a detector circuit 20 and readout indicators 30 which, as discussed for FIG. 3 hereinafter, take the form of colored lights. Also shown as a block in FIG. 1 is a synchronous gate control 40.

A specific suitable power supply arrangement is shown in FIG. 2. A 115 volt 60 cycle supply is derived from a plug 41 through a switch S1 which serves to energize lines ACA and ACB. The circuit shown uses thyratrons and vacuum tubes but, for simplicity in the showing, the cathode heaters, and the supply therefor, are not shown.

In order to provide time for the filaments to warm up, a time delay is provided in the form of a time delay closing relay K2. Before K2 operation the high voltage (D.C.) is not applied for the test, as will be seen in FIG. 2. In order to provide timing for the duration of the test an electronic time delay circuit 50 is provided, having a thyratron V7 which might be a triode as shown or might be a tetrode. The circuitry of the timer being fairly standard it need not be further described except to say that it is energized only when the coil of a relay K10 (FIG. 3) is energized, and the timer circuit 50 in turn energizes the coil of a relay K1. It should be apparent from FIG. 2 (or more particularly from FIG. 4) that a bridge circuit is provided which includes the test winding 17 and the reference winding 18.

Returning to FIG. 2, "Power On" energizes relay coil K2 and through transformer T1 and through a rectifier V1 (which could be a tube) energizes a transformer T3 but only when K10 is closed and the thyratron V2 of the synchronous control 40 fires. T3 energizes firing circuits for the thyratrons V3 and V4, a positive voltage spike being produced by the one and a negative voltage spike being produced by the other. Additionally their cathode to anode circuits are respectively energized through T6 and a manual or automatic switch S6, transformer T2, rectifiers V5 and V6 (which could be tubes), and charging capacitors C5 and C6, as shown. A meter M1 is used in conjunction with the manual setting of T6 and, although it reads an A.C. voltage, it can be calibrated in terms of peak D.C. volts so that it can be preset before S6 is closed (thus before there is any high voltage D.C. present so as not to risk ruining the windings 17–18 for any particular production run). A meter M2 is useful to find the relative magnitude of any fault. M2 is preferably a zero center meter and thus useful for setting the null adjustment through a tap on R11, for example to take care of minute variations in various runs of motors, transformers, or whatever it might be that is having its windings tested.

It will be seen in FIG. 2 that the circuit to M2, from the juncture of "common" leads of test windings 17 and reference winding 18, is through a K6 contact, in contact with a grounded shunt capacitor C9, through a resistor R15, and in contact with a varistor RV1. As is known, a varistor presents a resistance which varies inversely as a non-linear function (e.g., the logarithm) of applied voltage. Other types of inverse characteristic voltage regulator apparatus might, of course, be used instead. During operation, the varistor RV1, being connected across a voltage source through proper impedances, causes high voltages to be reduced, but not clipped, thus preserving their general wave shape. This permits the equipment to be responsive to both small and large deviations from the null setting. The meter M2, used to make such setting, is a detector (of faults, and of magnitude of faults) and does not require any unusual quick response characteristics since it operates from a signal stored in a capacitor (C9), but most generally when the word "detector" is used herein it refers to the detector 20 (later to be described in connection with FIG. 3) which derives its signal from the D2 connection placed (for example) as shown in FIG. 2, and which has its bias derived from a regulated D.C. power supply 21 (shown in FIG. 2). This power supply 21 for the detector 20 has a full wave rectifier bridge 22, triodes V12a and V12b, and a voltage reference tube V13. A rotary switch S5 is normally (usually) in the "Off" position, but is available to feed either of two polarities (as determined by selection of circuitry through a rectifier CR3 or through a rectifier CR4) into the D2 "line" to simulate a fault (with no test or reference winding connected) thus to check out the detection part of the system.

Referring next to FIG. 3, the detector 20 comprises two circuits having oppositely disposed rectifiers, CR1 and CR2, respectively charging associate capacitors C10 and C11. Each circuit has a cathode follower triode (V8 and V9) each of which could advantageously be a twin triode with its elements connected in parallel. Each half of the detector has an output tube (V10, V11), preferably thyratrons and which, though shown as triodes, could be tetrodes with suppressor grids. Each detector half controls a different one of the coils of relays K4 and K5, respectively, while a sensitivity adjustment (as regards the test coil 17 of FIG. 1) is derived by adjusting grid bias through potentiometer R23 and a sensitivity adjustment (for the reference coil 18 of FIG. 1) is made by adjusting potentiometer R41.

Below the Detector circuit 20 a Logic circuit 60 is shown energizable from ACA and ACB. S3 is a reset button whose function will be later described. Through a normally closed (when de-energized) relay K11 contact, a relay K9 is picked up whenever K4 coil is energized. K9 thereupon seals itself in (until S3 is closed). A K12 relay coil is picked up whenever K5 is not energized, and K12 seals itself in. A relay K13 coil is energized when K6 is closed, K9 is de-energized, K12 is de-energized; K4 is de-energized, and K5 is energized, as soon as the timer 50 has caused K1 to pick-up (indicating test completion after the assumed one second time delay). K13 seals itself in if the associate n.c. contacts K9 and K12 are closed as shown. A lever switch S4 is, as shown, assumed to have a mid tap which is inoperative (neutral), a "Surge" position which picks-up relay K6 (closing the K6 contacts shown in FIGS. 3 and 2), and an "Extra" or spare position which can be used (preferably with additional relays and indicator lamps, not shown) if it is desired to "Surge" a second winding against the "reference," or, in a three phase arrangement, surge first one phase winding and then another phase winding as compared with the winding provided on the same machine for a third phase. K6 closing energizes the coil of K10 and energizes the Gate Circuit 40, and starts the Timer 50 (see FIG. 1).

The Indicator Circuit 30 may comprise a Yellow Lamp I5 to indicate the fact that the time delay closing relay K2 has not pulled-in (i.e., that the three minute filament warm up time has not yet elapsed) so that the high voltage D.C. is not yet available through T6, 11 and 12 (see FIG. 2); a Blue Lamp I7 to show that K2 has operated, a Green Lamp I3 to indicate no-fault after elapse of the one second allowed for the test; a Red Lamp I2 to indicate a fault in what may be called the Ground to D2 direction, typically a fault in the reference winding, and a Red Lamp I1 to indicate a fault in what may be called the D2 to Gnd. direction, typically a fault in the "test" winding.

In operation as S4 is placed on "surge" (and supposing a fault is found and K4 pulls-in, see top half of Detector Circuit in FIG. 3) although the Thyratron V10 (FIG. 3) ceases firing in the next half cycle, a shunt capacitor C12 (FIG. 3) is used to keep K4 energized, for negative half cycles, energizing K9 which seals itself in and lights Red Lamp I1 (until reset button S3 is actuated). K4 drops out shortly after the test period ends and the fault signal is no longer present.

The operation is otherwise for K5 which (see FIG. 3) is normally pulled in by V11 bias. If there is a fault in the reference coil winding, then Detector Circuit current (Gnd. to D2) flows in such direction that a negative spike causes Thyratron V11 to drop out, dropping K5, closing contact K5 (n.c.), energizing K12 which seals itself and lights Red Lamp I2. K5 pulls in shortly after the test period ends and the fault signal is no longer present.

While either I2 or I1 will light in the case of an associate winding fault in the form of an open circuit or shorted turn or turns, these conditions are distinguished from a "ringing" fault as caused by a short to ground (assuming S7, S8 are closed to ground the iron cores) which condition causes both Red Lamps (I1 and I2) to light. Thereafter the switches S7, S8 can be manipulated to find more exactly the location of the ground fault.

Advantages of the system include the fact that it will not work if, with a red lamp lit, the operator forgets to reset (by closing S3 to de-energize K9, K12 and K13, shutting off all lamps). Another advantage is the fact that one time delay is provided (through K2) to assure proper warm-up of filaments before tests can be made. Fulfillment of this condition is indicated by blue lamp 17 whereupon, if M1 indicates that the High Voltage D.C. will be of proper value for the particular test, operator presses S4, and then another time delay subsequently exists (after S4 is closed) to insure (through 50) exact duration of each surge test, V2 firing circuit being cut-off (hence V3 and V4 cut-off) as soon as such time has elapsed although all lamps indicative of condition found remain lit. Many other advantages of the arrangement described will be apparent to those familiar with the art. For example, null adjustment tap (at R11) not only is used to manually balance for small variations in test and reference winding characteristics, but it also provides a discharge circuit for the principal capacitors in case one of those windings is open circuited. Further, with 60 pulses per second applied to the detector circuit capacitors C10 and C11, which charge fast but discharge relatively slowly, the thyratron firing level is reached in one step or by many in such manner that a major fault causes fast reaction, a less serious fault requires more time for reaction, and a very minor fault (e.g., a self-clearing one as might be caused by a metal chip which vaporizes so as to disappear from the winding) causes no reaction at all, as is desirable.

There is thus provided apparatus of the class described capable of meeting the objects above set forth. While a particular embodiment has been illustrated and described, various modifications may obviously be made without departing from the true spirit and scope of the invention which is intended to be defined only by the appended claims taken with all reasonable equivalents.

We claim:
1. Surge apparatus for testing electrical equipment windings and the like and comprising:
   a transformer (T3) having one primary winding and two secondary windings,
   first means for applying a voltage of one polarity to a test winding (17), said means having a load circuit and a control circuit, said load circuit including said test winding (17), a charged capacitor (C5), and the load circuit elements of a thyratron (V4), while said control circuit includes one of said transformer (T3) secondary windings and the control circuit elements of said thyratron (V4), said load circuit being without lumped series resistance,
   second means for simultaneously applying a voltage of opposite polarity to a reference winding (18), said means having a load circuit and a control circuit, said load circuit including said reference winding (18), a charged capacitor (C6), and the load circuit elements of a thyratron (V3), while said control circuit includes the other of said transformer (T3) secondary windings and the control circuit elements of said last mentioned thyratron (V3), said last mentioned load circuit being without lumped series resistance, and
   means for sensing and indicating the difference of instantaneous voltage drops in the two windings due to voltage as thus applied, said last means including a bridge connection (FIG. 4) of the two load circuits and at least one indicator (30 of FIG. 4, M2 of FIG. 3, or predetermined amplifying means and a lamp of FIG. 2) connected responsive to unbalances in the bridge.

2. Apparatus as in claim 1 further characterized by the sensing and indicating means comprising:
   (a) a detector (FIG. 3) having a circuit for sensing current in one directional sense (having CR1) indicative of low voltage across the test winding (17) and having a circuit for sensing current in an opposite directional sense (through CR2) indicative of low voltage across the reference winding (18), each of which circuits includes a potentiometer (R23, R41, respectively) for making response characteristics manually adjustable, and
   (b) a readout device (for CR1: V8, V10, K4, K9, Red Light I1, for CR2: V9, V11, K5, K12; Red Light I2) having at least two colored lamps connected one responsive to one of said sensing circuits and the other connected responsive to the other of said sensing circuits.

3. Apparatus as in claim 1 further characterized by a potentiometer (R11) having a fixed resistance connected across the bridge connection of the two load circuits and having a manually adjustable tap connected to a common point between the two capacitors, for adjustably balancing impedances of the circuits of the test and reference windings.

4. Apparatus as in claim 1 further characterized by a switch (S4, K6) connected in said first means' load circuit and connected in said second means' load circuit and connecting the windings (17, 18) to the thyratrons (V4, V3), a time delay means (50, K1) connected to be energized by said switch (S4, K6, K10) and connected (through K1, T3) to de-energize the control circuits of the first and second means for removing voltages from the windings (17, 18).

5. Apparatus as in claim 4 further characterized by the readout device having at least three colored lamps, one lamp (I1) connected to show a fault in one winding, another lamp (I2) connected to show a fault in the other winding, and the third lamp (I3) connected responsive to the first current directional sense circuit (of CR1 and K4), and responsive to the second current directional sense circuit (of CR2 and K5) and responsive to the second time delay means (50, K1), and responsive to the second switch (S4, K6) to show that the circuits are in "Go" condition and that a completed test showed no fault.

6. Apparatus as in claim 1 further characterized by each of the windings having an associate iron core, a pair of switches connected one for placing the core of one winding into connection with the bridge formed by the two load circuits and the other for placing the core of the other winding into connection with the bridge formed by the two load circuits.

7. Apparatus as in claim 3 further characterized by
   a switching means (K6) connected to de-energize each of the test and reference windings without disturbing the adjustable tap setting and without disturbing power supply to the apparatus other than the windings.

8. In apparatus of the type having thyratrons for simultaneously surge testing a test winding and a reference winding,
   a time delay device (K2, K6) connected in circuit with said test and said reference windings and for preventing application of voltage thereto before warm-up of the thyratrons,
   a detector circuit connected to a midpoint between the test and reference windings and connected to another midpoint between the thyratrons for discovering discrepancies in voltages across the two windings,
   at least one fault indicator (I1, or I2) associated with said detector circuit,
   a no-fault indicator (I3) associated with said detector circuit,
   and a logic circuit means interposed between the detector circuit and the no-fault indicator for preventing operation of said no-fault indicator until the time delay of said time delay device is complete (K2, K6) and for also preventing operation of said no-fault indicator after operation of the fault indicator unless the circuit is manually reset (S3, K11, K6, K13, K9, K12).

9. Surge apparatus for testing electrical test as against reference windings and the like and comprising
   a first capacitor (C5) source of D.C.,
   a second capacitor (C6) source of D.C.,
   a first thyratron (V4),
   a second thyratron (V3), a loop circuit including the first capacitor, the load circuit of the first thyratron, a reference winding, a test winding, the load circuit of the second thyratron, and the second capacitor, a first transformer primary and secondary winding combination source of A.C.

a second transformer primary and secondary winding combination source of A.C. including the same primary but a different secondary winding, connections from said first transformer combination source of A.C. to the control circuit of the first thyratron, and connections from said second transformer combination source of A.C. to the control circuit of the second thyratron, whereby to enable firing the thyratrons in synchronism and limiting surge rise time to not more than 0.2 microsecond.

10. Surge apparatus as in claim 9 further characterized by said loop circuit being free of lumped series resistance, a detector circuit connected from the point of juncture of the capacitors to the points of juncture of the windings, said detector circuit including a shunt capacitor (C9) for integrating, and a suppression network having a series resistance (R15) and a non-linear voltage characteristic shunt resistance (RV1) for compressing signal while preserving the characteristic of response time being a function of winding fault magnitude, and said detector circuit also having a readout device (M1, or I1, etc.).

References Cited

UNITED STATES PATENTS

| | | | |
|---|---|---|---|
| 2,284,423 | 5/1942 | Hansell | 324—132 |
| 2,436,615 | 2/1948 | Stearns | 324—54 |
| 2,578,499 | 12/1951 | Bauer | 324—54 |
| 2,701,336 | 2/1955 | Anderson | 324—54 |
| 2,806,993 | 9/1957 | Matousek | 324—51 |
| 2,858,507 | 10/1958 | Liautaud et al. | 324—51 X |
| 2,895,106 | 7/1959 | Taunt | 324—51 X |
| 2,956,229 | 10/1960 | Henel | 324—133 |
| 2,990,514 | 6/1961 | Johnson | 324—55 |
| 3,045,177 | 7/1962 | Weed | 324—54 |
| 3,141,128 | 7/1964 | Behr | 324—51 |

WALTER L. CARLSON, *Primary Examiner.*

G. R. STRECKER, *Assistant Examiner.*